Sept. 29, 1964

W. H. CHURCHILL 3,150,556

SHEET METAL NUT AND ASSEMBLY

Filed Nov. 1, 1961

INVENTOR.
WILMER H. CHURCHILL
BY *Walter P. Jones*

United States Patent Office 3,150,556
Patented Sept. 29, 1964

3,150,556
SHEET METAL NUT AND ASSEMBLY
Wilmer H. Churchill, Wellesley, Mass., assignor to United-Carr Incorporated, a corporation of Delaware
Filed Nov. 1, 1961, Ser. No. 149,240
8 Claims. (Cl. 85—32)

This invention relates to a nut-and-stud assembly and to a sheet-metal nut therefor. The nut is highly resilient, being of the class that is usually formed from annealed spring steel, then hardened and tempered, and finally given a suitable rust-resistant finish.

The stud may be threaded or initially threadless; and the nut may have thread engagers or thread-forming teeth, as the case may be. The stud may be integral with a part that is to be mounted, or it may be a separate part as in the case of a bolt or a machine screw. The invention will be disclosed as applied to a self-threading sheet-metal nut, and an initially threadless stud which is integral with automobile trim or the like that is to be mounted.

Many forms of sheet-metal nuts have been devised, having various advantages and disadvantages. In Becker U.S. Patent 2,969,705 the nut has the advantage of the thread-making teeth being close to the base of the nut. This permits the nut to be used on relatively short studs. In the fully applied nut the thread-making teeth are close to the bottom of the stud, and this is advantageous where the stud is plated with nickel and chromium. Such plating interferes with the thread-making operation, and the plating is likely to be thinner toward the bottom of the stud. As regards disadvantages, the nut of the Becker patent is too large for use under severe space limitations. Additionally, it requires a special wrench. Further, the resilient take-up of the nut upon wear or shrinkage of the clamped parts is not as wide-range and positive as is often desirable, being provided primarily by two downwardly inclined ears.

The nut of Duffy et al. U.S. Patent 2,986,059 may be used in smaller space than the nut of the Becker patent, and it can be applied with a conventional wrench. However, the Duffy et al. nut does not have the advantage of the thread-making teeth being close to the base of the nut whereby a relatively short stud can be used and, in the fully applied nut, the teeth engage a plated stud at a point where the plating is likely to be relatively thin. Further, the shell of the Duffy et al. nut is occasionally distorted outwardly when the nut is forced onto a stud which is greatly oversize or which is much overplated. While this is of infrequent occurrence the resultant sticking of the nut in the wrench is undesirable.

Among the objects of the invention are to provide a nut which combines the advantage of the Becker nut and the Duffy et al. nut; to provide a self-threading nut in which outward expansion due to too-high pressure on the thread-making teeth is not transmitted to the shell of the nut; to provide an assembly which can be made with a conventional wrench and which will place the stud-engaging teeth close to the bottom of the nut; and to provide an assembly which, upon wear or shrinkage of the clamped parts, will have resilient take-up of wide range and firm action.

Various other objects and advantages will be apparent from the detailed description hereinafter.

The drawings and the description thereof are by way of illustration and example only, even though they disclose the best mode in which I have contemplated applying my invention.

FIG. 1 of the drawing is a top plan view of the nut on an enlarged scale, the particular nut being for a ⅛″ stud;

Figure 4:
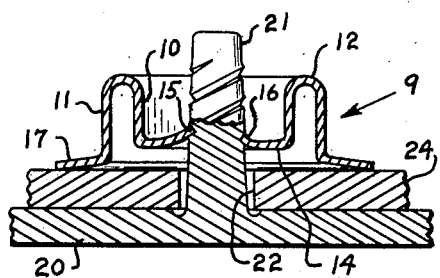
FIG. 4 shows an assembly made with the nut of FIGS. 1–3, the view being in section corresponding to the line 4—4 of FIG. 1 except for the upper portion of the stud which is in elevation.

For convenience the nut and the other parts of the assembly will be referred to on the basis of the stud being vertical as shown in FIG. 4 and the nut being applied downwardly on the stud.

Figure 3:
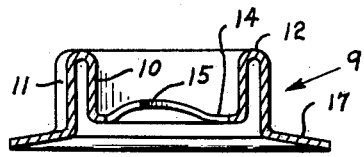
FIG. 3 is a section on the line 3—3 of FIG. 1.

The nut 9 is in one piece and is of springy sheet metal of suitable thickness. The nut has inner tubular portion 10 and outer tubular portion 11 which are spaced from each other by at least a small amount as shown in FIGS. 3 and 4. Tubular portions 10 and 11 are connected together at the top by an annular bight 12. At the bottom of inner tubular portion 10 there is a transverse web 14 that is formed with opposed thread-making teeth 15 and 16 as in Becker U.S. Patent 2,969,705 or Duffy et al. U.S. Patent 2,986,059. Extending outwardly from the bottom of the outer tubular portion 11 there is a conical washer 17.

Figure 1:
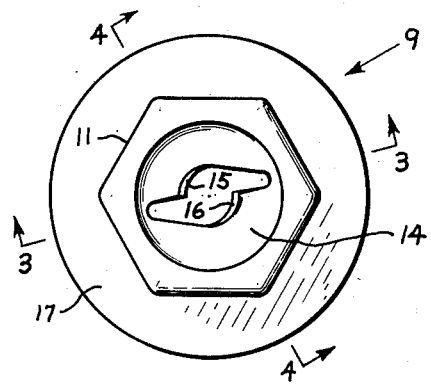
Figure 2:
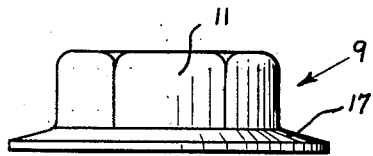
FIG. 2 is a side elevation of the nut of FIG. 1, looking from the bottom of FIG. 1.

The inner tubular shell 10 is of substantially cylindrical cross section. The outer tubular shell 11 is hexagonal as is perhaps best seen in FIG. 1, thereby providing for application of the nut by use of a conventional hex wrench.

In FIG. 4, automobile trim or the like 20 has integral therewith a die-cast stud 21 which passes through a hole 22 in an automobile-body member 24 to which the trim 20 is to be attached. The nut 9 is rotatively applied to the stud with a conventional hex wrench in conventional manner, being advanced far enough on the stud to cause the washerlike base 17 to clampingly engage the body member and draw the trim 20 tight against the opposite face of the body member.

As the nut is tightened down to final position the washer 17 is flattened somewhat and the upward pressure on the washer is transmitted through outer tubular portion 11, the bight 12, inner tubular portion 10 and the teeth 15 and 16 to the stud 21. In other words the nut as a whole is resiliently flexed by upward pressure of body member 24 on the rim of washer 17 and downward pressure of the stud 21 on the teeth 15 and 16. Due to the long and looping expanse of metal between the periphery of the rim 17 and the stud-engaging teeth, the nut yields resiliently over a substantial range. This resilient yielding is available for take-up upon wear or shrinkage of the clamped parts.

It is not necessary to so design the nut that the teeth 15 and 16 will not be forced outwardly upon application of the nut to the stud. While outward forcing of the teeth will expand the inner tubular portion 10, the expansion is not transmitted to the outer tubular portion 11 and, therefore, will not cause the nut to stick in the wrench.

I claim:
1. A nut-and-stud assembly comprising:
   a stud projecting from a member and having a free end pointing away from the member;

an outer tube of springy sheet-metal surrounding the
stud in spaced relation thereto,
  the outer tube being coaxial with the stud and
    being provided with a series of wrench faces;
a disc-like web of springy sheet-metal disposed transversely of the stud and located within the outer tube
in spaced relation thereto,
  the outer periphery of the disc-like web being at
    a level close to the bottom of the outer tube,
    and the bottom of the outer tube being toward
    said member from which the stud projects,
  and the disc-like web being centrally pierced and
    making threaded engagement with the stud;
and means to prevent outward expansion, which the
stud may impose on the disc-like web, from being
transmitted to the outer tube and expanding the outer
tube,
  said means comprising an inner tube of springy
    sheetmetal,
      the inner tube having a peripherally-continuous wall that is coaxial with the stud,
      the inner tube being no longer than the outer
        tube and, throughout its length, being in
        spaced relation to the stud and to the outer
        tube,
      the wall of the inner tube being perpendicular
        to the general plane of the disc-like web,
      the lower end of the inner tube being toward
        said member from which the stud projects
        and being homogeneous with the outer periphery of the disc-like web,
      the upper end of the inner tube being toward
        the free end of the stud and being homogeneously connected by an annular bight
        to the upper end of the outer tube, which is
        also toward the free end of the stud,
      and the wall of the inner tube extending parallel to the axis of the stud whereby outward force imposed on the bottom of the
        inner tube by expansion of said disc-like
        web has substantially no component extending along the wall of the inner tube
        to the bight at the upper end thereof, the
        bight being toward the free end of the stud.

2. A nut-and-stud assembly comprising:
an initially-threadless stud projecting from a member
and having a free end pointing away from the
member;
an outer tube of springly sheet-metal surrounding the
stud in spaced relation thereto,
  the outer tube being coaxial with the stud and
    being provided with a series of wrench faces;
a disc-like web of springy sheet-metal disposed transversely of the stud and located within the outer tube
in spaced relation thereto,
  the outer periphery of the disc-like web being at a
    level close to the bottom of the outer tube, and
    the bottom of the outer tube being toward said
    member from which the stud projects,
  and the disc-like web being centrally pierced and
    being provided with opposed thread-forming
    teeth which make threaded engagement with the
    stud along separate paths;
and means to prevent outward expansion, which the
stud may impose on the disc-like web, from being
transmitted to the outer tube and expanding the outer
tube,
  said means comprising an inner tube of springy
    sheet-metal,
      the inner tube having a peripherally-continuous wall that is coaxial with the stud, the
        inner tube being no longer than the outer
        tube and, throughout its length, being in
        spaced relation to the stud and to the outer
        tube,
      the wall of the inner tube being perpendicular
        to the general plane of the disc-like web,
      the lower end of the inner tube being toward
        said member from which the stud projects
        and being homogeneous with the outer periphery of the disc-like web,
      the upper end of the inner tube being toward
        the free end of the stud and being homogeneously connected by an annular bight to
        the upper end of the outer tube, which is
        also toward the free end of the stud,
      and the wall of the inner tube extending parallel to the axis of the stud whereby outward force imposed on the bottom of the
        inner tube by expansion of said disc-like
        web has substantially no component extending along the wall of the inner tube
        to the bight at the upper end thereof, the
        bight being toward the free end of the stud.

3. A nut-and-stud assembly comprising:
a stud;
a member through which the stud passes;
an outer tube of springy sheet-metal surrounding the
stud in spaced relation thereto,
  the outer tube being coaxial with the stud and being provided with a series of wrench faces;
a sheet-metal washer extending outwardly and downwardly from the lower end of the outer tube,
  the washer being homogeneous with the outer tube,
    being axially-springy, and resiliently clamping
    said member through which the stud passes;
a disc-like web of springy sheet-metal disposed transversely of the stud and located within the outer tube
in spaced relation thereto,
  the disc-like web, taken as a whole, being at a level
    close to the bottom of the outer tube,
  and the disc-like web being centrally pierced and
    making threaded engagement with the stud;
and an inner tube of springy sheet-metal,
  the inner tube being coaxial with the stud,
  the inner tube throughout its length being in
    spaced relation to the stud and to the outer tube,
  the wall of the inner tube being perpendicular to
    the disc-like web,
  the lower end of the inner tube being homogeneous with the outer periphery of the disc-like web,
  the upper end of the inner tube being homogeneously connected by an annular bight to the
    upper end of the outer tube,
  and the wall of the inner tube extending parallel
    to the axis of the stud throughout a substantial
    portion of the height of the outer tube.

4. A nut-and-stud assembly comprising:
a stud;
a member through which the stud passes;
an outer tube of springy sheet-metal surrounding the
stud in spaced relation thereto,
  the outer tube being coaxial with the stud and being provided with a series of wrench faces;
a sheet-metal washer extending outwardly and downwardly from the lower end of the outer tube,
  the washer being homogeneous with the outer
    tube, being axially-springy, and resiliently
    clamping said member through which the stud
    passes;
a disc-like web of springy sheet-metal disposed transversely of the stud and located within the outer tube
in spaced relation thereto,
  the disc-like web, taken as a whole, being at a
    level close to, and somewhat above, the level
    of said washer,
  and the disc-like web being centrally pierced and
    making threaded engagement with the stud;
and an inner tube of springy sheet-metal, the inner tube being coaxial with the stud,
the inner tube throughout its length being in spaced relation to the stud and to the outer tube,
the wall of the inner tube being perpendicular to the general plane of the disc-like web,
the lower end of the inner tube being homogeneous with the outer periphery of the disc-like web,
the upper end of the inner tube being homogeneously connected by an annular bight to the upper end of the outer tube,
and the wall of the inner tube extending parallel to the axis of the stud throughout the major portion of the height of the outer tube.

5. A nut-and-stud assembly comprising:
an initially-threadless stud;
a member through which the stud passes;
an outer tube of springy sheet-metal surrounding the stud in spaced relation thereto,
the outer tube being coaxial with the stud and being provided with a series of wrench faces;
a sheet-metal washer extending outwardly and downwardly from the lower end of the outer tube,
the washer being homogeneous with the outer tube, being axially-springy, and resiliently clamping said member through which the stud passes;
a disc-like web of springy sheet-metal disposed transversely of the stud and located within the outer tube in spaced relation thereto,
the disc-like web, taken as a whole, being at a level close to the bottom of the outer tube,
and the disc-like web being centrally pierced and being provided with opposed thread-forming teeth which make threaded engagement with the stud along separate paths;
and an inner tube of springy sheet-metal,
the inner tube being coaxial with the stud,
the inner tube throughout its length being in spaced relation to the stud and to the outer tube,
the wall of the inner tube being perpendicular to the general plane of the disc-like web,
the lower end of the inner tube being homogeneous with the outer periphery of the disc-like web,
the upper end of the inner tube being homogeneously connected by an annular bight to the upper end of the outer tube,
and the wall of the inner tube extending parallel to the axis of the stud throughout a substantial portion of the height of the outer tube.

6. A springy 1-piece sheet-metal nut for rotative application to a stud, comprising:
an outer tube provided with a series of wrench faces that are adapted to receive a conventional wrench;
a washer extending outwardly and downwardly from the lower end of the outer tube,
the washer being homogeneous with the outer tube and being axially-springy;
a disc-like web located within the outer tube in spaced relation thereto and disposed transversely of the axis of the outer tube,
the outer periphery of the disc-like web being at a level close to, and somewhat above, the bottom of the outer tube,
and the disc-like web being centrally pierced and being provided with female thread means for making threaded engagement with the stud;
and an inner tube of springy sheet-metal,
the inner tube being coaxial with the outer tube,
the inner tube throughout its length being of uniform diameter and in spaced relation to the outer tube,
the wall of the inner tube being perpendicular to the general plane of the disc-like web,
the internal diameter of the inner tube being appreciably greater than the largest transverse dimension between stud-contacting portions of said female thread means,
the lower end of the inner tube being homogeneous with the outer periphery of the disc-like web, with the disc-like web extending inwardly from the inner wall-surface of the inner tube,
the upper end of the inner tube being homogeneously connected by an annular bight to the upper end of the outer tube,
and the wall of the inner tube extending parallel to the axis of the outer tube throughout a substantial portion of the height of the outer tube.

7. A springy 1-piece sheet-metal nut for rotative application to an initially-threadless stud, comprising:
an outer tube provided with a series of wrench faces that are adapted to receive a conventional wrench;
a washer extending outwardly from the lower end of the outer tube,
the washer being homogeneous with the outer tube;
a disc-like web located within the outer tube in spaced relation thereto and disposed transversely of the axis of the outer tube,
the outer periphery of the disc-like web being at a level close to the bottom of the outer tube,
and the disc-like web being centrally pierced and being provided with opposed thread-forming teeth for making threaded engagement with the initially-threadless stud along separate paths;
and an inner tube of springy sheet-metal,
the inner tube being coaxial with the outer tube,
the inner tube throughout its length being of uniform diameter and in spaced relation to the outer tube,
the wall of the inner tube being perpendicular to the general plane of the disc-like web,
the internal diameter of the inner tube being appreciably greater than the largest transverse dimension between the stud-contacting portions of said thread-forming teeth,
the lower end of the inner tube being homogeneous with the outer periphery of the disc-like web, with the disc-like web extending inwardly from the inner wall-surface of the inner tube,
the upper ends of the inner tube being homogeneously connected by an annular bight to the upper end of the outer tube,
and the wall of the inner tube extending parallel to the axis of the outer tube throughout a substantial portion of the height of the outer tube.

8. A springy 1-piece sheet-metal nut for rotative application to a stud, comprising:
an outer tube provided with a series of wrench faces that are adapted to receive a conventional wrench;
a disc-like web located within the outer tube in spaced relation thereto and disposed transversely of the axis of the outer tube,
the outer periphery of the disc-like web being at a level close to, and somewhat above, the bottom of the outer tube,
and the disc-like web being centrally pierced and being provided with female thread means for making threaded engagement with the stud;
and an inner tube of springy sheet-metal,
the inner tube being coaxial with the outer tube,
the inner tube throughout its length being of uniform diameter and in spaced relation to the outer tube,
the wall of the inner tube being perpendicular to the general plane of the disc-like web,
the internal diameter of the inner tube being appreciably greater than the largest transverse dimension between the stud-contacting portions of said female thread means, the lower end of the inner tube being homogeneous with the outer periphery of the disc-like web, with the disc-like web extending inwardly from the inner wall-surface of the inner tube, the upper ends of the inner tube being homogeneously connected by an annular bight to the upper end of the outer tube, and the wall of the inner tube extending parallel to the axis of the outer tube throughout a substantial portion of the height of the outer tube.

References Cited in the file of this patent

UNITED STATES PATENTS

| | | |
|---|---|---|
| 2,284,081 | Beggs | May 26, 1942 |
| 2,552,794 | Kimbell | May 15, 1951 |
| 2,734,547 | Hotchkin | Feb. 14, 1956 |
| 2,824,480 | Hotchkin | Feb. 25, 1958 |
| 2,901,938 | Van Buren | Sept. 1, 1959 |
| 2,945,524 | Becker | July 19, 1960 |
| 2,969,705 | Becker | Jan. 31, 1961 |
| 2,986,059 | Duffy et al. | May 30, 1961 |

FOREIGN PATENTS

| | | |
|---|---|---|
| 545,771 | Great Britain | June 11, 1942 |